US011616828B2

(12) United States Patent
Im et al.

(10) Patent No.: US 11,616,828 B2
(45) Date of Patent: Mar. 28, 2023

(54) SYSTEM AND METHOD FOR REMOTE SUPPORT, AND WEB APPLICATION SERVER FOR EXECUTING THE SAME

(71) Applicant: SAMSUNG SDS CO., LTD., Seoul (KR)

(72) Inventors: Dae Hyuck Im, Seoul (KR); Yu Hwan Keum, Seoul (KR); Seung Yong Shin, Seoul (KR); You Dong Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 17/511,969

(22) Filed: Oct. 27, 2021

(65) Prior Publication Data

US 2022/0131927 A1    Apr. 28, 2022

(30) Foreign Application Priority Data

Oct. 27, 2020  (KR) .................. 10-2020-0140746

(51) Int. Cl.
*H04L 67/025* (2022.01)
*H04L 67/562* (2022.01)
(Continued)

(52) U.S. Cl.
CPC .......... *H04L 67/025* (2013.01); *H04L 9/0822* (2013.01); *H04L 41/5009* (2013.01); *H04L 41/5022* (2013.01); *H04L 63/0869* (2013.01); *H04L 67/125* (2013.01); *H04L 67/562* (2022.05)

(58) Field of Classification Search
CPC ............ H04L 67/01–025; H04L 67/04; H04L 67/125; H04L 67/56–562
See application file for complete search history.

(56) References Cited

U.S. PATENT DOCUMENTS 8,320,904 B1 * 11/2012 Celentano ............. H04W 24/04
709/224
8,924,461 B2 * 12/2014 Gentile ............... H04L 41/0246
709/219

(Continued)

FOREIGN PATENT DOCUMENTS

KR    10-2019-0129238 A    11/2019

*Primary Examiner* — Brendan Y Higa
(74) *Attorney, Agent, or Firm* — The PL Law Group, PLLC

(57) ABSTRACT

A system for a remote support according an embodiment includes a web viewer configured to receive a request for execution of a remote support service from a logged-in administrator, a web application server configured to receive a request for generation of a connection space for the remote support service from the web viewer and generate a first connection space and a first connection code for identifying the first connection space based on the request for generation, a relay server configured to receive the first connection code, generate a second connection space in which the first connection code is stored, and receive a request for provision of the remote support service from a mobile terminal, and a message broker configured to mediate a plurality of message queues between the first connection space and the second connection space for the remote support service between the web viewer and the mobile terminal.

16 Claims, 7 Drawing Sheets

(51) Int. Cl.
*H04L 67/125* (2022.01)
*H04L 41/5022* (2022.01)
*H04L 9/08* (2006.01)
*H04L 9/40* (2022.01)
*H04L 41/5009* (2022.01)

(56) References Cited

U.S. PATENT DOCUMENTS

| | | | |
|---|---|---|---|
| 9,906,969 B2 * | 2/2018 | Shanmugam | H04L 43/50 |
| 10,095,571 B2 * | 10/2018 | Narayanan | H04L 41/344 |
| 10,228,926 B2 * | 3/2019 | Soini | H04L 67/01 |
| 11,303,521 B1 * | 4/2022 | Naik | H04L 41/069 |
| 2003/0139175 A1 * | 7/2003 | Kim | H04L 69/161 |
| | | | 455/418 |
| 2011/0213821 A1 * | 9/2011 | Gentile | H04L 41/0246 |
| | | | 709/202 |
| 2015/0289152 A1 * | 10/2015 | Shanmugam | H04W 24/04 |
| | | | 455/425 |
| 2017/0310832 A1 * | 10/2017 | Fukushima | H04L 12/4625 |

* cited by examiner

SYSTEM AND METHOD FOR REMOTE SUPPORT, AND WEB APPLICATION SERVER FOR EXECUTING THE SAME

CROSS-REFERENCE TO RELATED APPLICATION

This application claims the benefit under 35 USC § 119(a) of Korean Patent Application No. 10-2020-0140746, filed on Oct. 27, 2020, in the Korean Intellectual Property Office, the entire disclosure of which is incorporated herein by reference for all purposes.

BACKGROUND

1. Field

The disclosed embodiments relate to a technology for providing a remote support service in a mobile environment.

2. Description of Related Art

Recently, as many companies aim to provide mobile-oriented services, the center of work has shifted to the mobile environment, and naturally, solving various issues that occur in the mobile environment as well as the existing PC has become a major concern.

To solve this, a remote support service that solves an issue by remotely operating a terminal by an administrator is in the spotlight, and such remote support service is mainly provided through an administrator's PC.

However, since the work environment of the remote support service administrator is also expanding from the existing PC environment to the mobile environment using various devices such as tablet PCs and smartphones, there is an increasing demand to perform works related to the remote support service in the mobile environment.

SUMMARY

The disclosed embodiments are intended to provide a means for improving user convenience by providing a remote support service in a mobile environment.

A system for a remote support according an embodiment of the disclosure includes a web viewer configured to receive a request for execution of a remote support service from a logged-in administrator, a web application server configured to receive a request for generation of a connection space for the remote support service from the web viewer and generate a first connection space and a first connection code for identifying the first connection space based on the request for generation, a relay server configured to receive the first connection code, generate a second connection space in which the first connection code is stored, and receive a request for provision of the remote support service from a mobile terminal, and a message broker configured to mediate a plurality of message queues between the first connection space and the second connection space for the remote support service between the web viewer and the mobile terminal.

The web viewer may be further configured to perform login for the administrator by a first method of authenticating an account with an enterprise mobility management (EMM) server in which the mobile terminal is registered after connection through a web address or a second method of connecting through the web address after authenticating the account with the EMM server.

The web application server may be further configured to, when the first connection space is generated, generate a dedicated queue connected to the first connection space and transmit the dedicated queue to the message broker, and the relay server may be further configured to connect the second connection space to the dedicated queue through the message broker.

The relay server may be further configured to, when receiving the request for provision, receive a second connection code input from the mobile terminal together with the first connection code, and determine whether or not to connect between the first connection space and the second connection space based on whether or not the first connection code and the second connection code match.

The message queue may include a control queue including data for managing a connection of the web application server, the relay server, the first connection space, or the second connection space, a command queue including remote support control data from the web viewer and remote support status data of the mobile terminal, and a file queue including an attached file transmitted between the web viewer and the mobile terminal.

A web application server according an embodiment of the disclosure includes a request receiver configured to receive a request for generation of a connection space for a remote support service from a web viewer, a generator configured to generate a first connection space and a first connection code for identifying the first connection space based on the request for generation, and a transmitter configured to transmit the first connection code to a relay server communicating with the mobile terminal through a message broker for the remote support service between the web viewer and the mobile terminal.

The transmitter may be further configured to, when the first connection space is generated, generate a dedicated queue connected to the first connection space and transmit the dedicated queue to the message broker.

The web application server may further include an encoder configured to generate an encryption key and encrypt data transmitted between the web viewer and the mobile terminal using the encryption key, and a decoder configured to generate a decryption key and decrypt encrypted data transmitted between the web viewer and the mobile terminal using the decryption key.

A method for a remote support according an embodiment of the disclosure includes receiving, by a web viewer, a request for execution of a remote support service from a logged-in administrator, receiving, by a web application server, a request for generation of a connection space for the remote support service from the web viewer, generating, by the web application server, a first connection space and a first connection code for identifying the first connection space the request for generation, receiving, by a relay server, the first connection code, generating, by the relay server, a second connection space in which the first connection code is stored, receiving, by the relay server, a request for provision of the remote support service from a mobile terminal, and mediating, by a message broker, a plurality of message queues between the first connection space and the second connection space for the remote support service between the web viewer and the mobile terminal.

The method for the remote support may further include performing, by the web viewer login for the administrator by a first method of authenticating an account with an enterprise mobility management (EMM) server in which the mobile terminal is registered after connection through a web address or a second method of connecting through the web address after authenticating the account with the EMM server.

The method for the remote support may further include after the generating of the first connection space and the first connection code, generating, by the web application server, a dedicated queue connected to the first connection space and transmitting the dedicated queue to the message broker, and connecting, by the relay server, the second connection space to the dedicated queue through the message broker.

In the receiving of the request for provision, the second connection code input from the mobile terminal may be received together with the first connection code.

The method for the remote support may further include, after the receiving of the request for provision, determining, by the relay server, whether or not to connect between the first connection space and the second connection space based on whether or not the first connection code and the second connection code match.

The message queue may include a control queue including data for managing a connection of the web application server, the relay server, the first connection space, or the second connection space, a command queue including remote support control data from the web viewer and remote support status data of the mobile terminal, and a file queue including an attached file transmitted between the web viewer and the mobile terminal.

A method for a remote support according to another embodiment of the disclosure includes receiving, by a request receiver of a web application server, a request for generation of a connection space for a remote support service from a web viewer, generating, by a generator of the web application server, a first connection space and a first connection code for identifying the first connection space, and transmitting, by a transmitter of the web application server, the first connection code to a relay server communicating with the mobile terminal through a message broker for the remote support service between the web viewer and the mobile terminal.

The method for the remote support may further include, after the generating, by the transmitter, generating a dedicated queue connected to the first connection space and transmitting the dedicated queue to the message broker.

The method for the remote support may further include generating, by an encoder of the web application server, an encryption key, encrypting, by the encoder, data transmitted between the web viewer and the mobile terminal using the encryption key, generating, by a decoder of the web application server, a decryption key, and decrypting, by the decoder, the encrypted data transmitted between the web viewer and the mobile terminal using the decryption key.

DETAILED DESCRIPTION

Hereinafter, a specific embodiment will be described with reference to the drawings. The following detailed description is provided to aid in a comprehensive understanding of the methods, apparatus and/or systems described herein. However, this is only an example, and the disclosed embodiments are not limited thereto.

In describing the embodiments, when it is determined that a detailed description of related known technologies related to the present disclosure may unnecessarily obscure the subject matter of the disclosed embodiments, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

Figure 1:
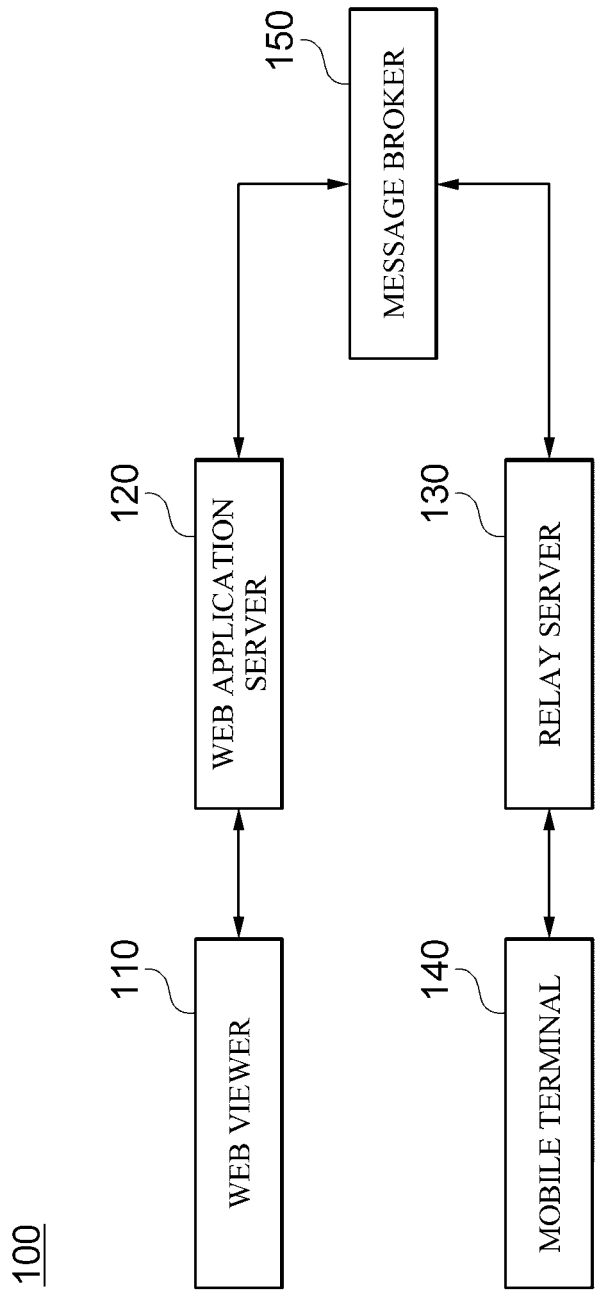
FIG. 1 is a block diagram illustrating a detailed configuration of a system for a remote support according to an embodiment.

FIG. 1 is a block diagram for explaining a detailed configuration of a system for a remote support 100 according to an embodiment.

As illustrated, the system for the remote support 100 according to an embodiment includes a web viewer 110, a web application server 120, a relay server 130, and a message broker 150. In addition, according to an embodiment, a mobile terminal 140 may be further included.

In the illustrated embodiment, each of the components may have different functions and capabilities other than those described below, and may include additional components in addition to those described below.

In addition, in the following embodiments, each component can send and receive data required for the remote support service through a communication network, and the communication network may include the Internet, one or more local area networks, wide area networks, cellular networks, mobile networks, other types of networks, or a combination of these networks.

The web viewer 110 is an application or web page operated by an administrator to provide a remote support service to the mobile terminal 140. In the following embodiments, the remote support service refers to a service in which an administrator remotely connects to the mobile terminal 140 through the web viewer 110 to diagnose and process a problem or error in real time when the problem or error occurs in performing a specific function in the mobile terminal 140.

To this end, the administrator may transmit a series of control signals to the mobile terminal 140 through the web viewer 110 and share screen information of the mobile terminal 140.

Meanwhile, the web application server 120 is a server that performs data processing, message queue management, connection management, etc. for the remote support service, and generates a connection space for sending and receiving data related to the remote support service. In this case, data transmitted or received by the web application server 120 may be encrypted data.

Meanwhile, the relay server 130 is a server that relays data between the mobile terminal 140 and the web application server 120 through the message broker 150. The relay server 130 serves to maintain a bidirectional connection between the mobile terminal 140 and the web application server 120, and record a log related to the web viewer 110 and the mobile terminal 140. In this case, the data transmitted or received by the relay server 130 may be encrypted data.

One or more such relay servers 130 may exist for each preset region.

Meanwhile, the mobile terminal 140 is a terminal that is a target to be connected remotely as the administrator of the web viewer 110 executes a remote support service, and may be, for example, a laptop computer, a tablet PC, a smartphone, etc., but is not necessarily limited thereto.

The mobile terminal 140 may include an agent (or application) for executing the remote support service, and may receive the remote support service from the web viewer 110 through the agent. The agent may perform various functions such as, for example, screen sharing for the remote support service, handling of events such as an administrator's screen click/execution of an application, and other application settings.

Hereinafter, the role played by each component for providing the remote support service will be described in detail.

The web viewer 110 receives a request for execution of the remote support service from a logged-in administrator.

According to an embodiment, the web viewer 110 may perform login for the administrator by a first method of authenticating an account with an enterprise mobility management (EMM) server in which the mobile terminal 140 is registered after connection through a web address or a second method of connecting through the web address after authenticating the account with the EMM server.

In the following embodiments, the 'EMM server' is a server in which the mobile terminal 140 that can be the target of the remote support service through the agent (or application) provided in the mobile terminal 140 is registered. The EMM server may provide various functions to the registered mobile terminal 140, such as device management, application services provided to the device, content management, etc.

Specifically, the login for the administrator in the web viewer 110 according to the first method may be made through the following process.

(1) An administrator requests connection to the web page by inputting a web address on a computing device.

(2) The web application server 120 receiving the connection request displays a login page on the web viewer 110.

(3) The administrator inputs EMM account information into the login page displayed on the web viewer 110.

(4) The web viewer 110 delivers the input EMM account information to the web application server 120.

(5) The web application server 120 delivers the EMM account information to the EMM server to verify whether or not the EMM account information is valid information.

(6) The EMM server verifies whether the transmitted EMM account information is valid information and delivers the verification result to the web application server 120.

(7) When it is determined that the EMM account information is valid as a result of the verification, the web application server 120 displays a remote support service page on the web viewer 100.

According to an embodiment, the EMM account information transmitted and received between the web application server 120 and the EMM server may be transmitted and received after being encrypted by a pre-generated public key.

Meanwhile, in detail, the login for) the administrator in the web viewer 110 according to the second method may be made through the following process.

(1) An administrator who has already logged in to the EMM server requests to execute the remote support service through the interface of the EMM server.

(2) The EMM server delivers data for obtaining an OAuth2 authentication token that proves execution authority to the web application server 120.

(3) The web application server 120 delivers the OAuth2 authentication token to the EMM server after performing an authentication process for the transmitted data.

(4) The EMM server calls Open API to obtain one time password (OTP) web address while delivering the OAuth2 authentication token to the web application server 120.

(5) After checking whether the transmitted OAuth2 authentication token is valid, the web application server 120 generates an OTP web address and delivers the OTP web address to the EMM server.

(6) The EMM server executes a web viewer for the remote support service via the transmitted OTP web address.

In this case, on the web viewer executed through the OTP web address, the administrator can provide a remote support service to the mobile terminal 140 without the need to input account information for a separate login. This is due to the fact that the administrator performs the second method while logging in in advance to the EMM server in which the mobile terminal 140 is registered.

The web application server 120 receives a request for generation of a connection space for the remote support service from the web viewer 110 and generates a first connection space and a first connection code for identifying the first connection space based on the received request for generation.

According to an embodiment, the first connection code may be a unique number specifying a place where the web viewer 110 and the message broker 150 are connected to each other on the web application server 120, and may have a value randomly selected within a preset range for every generation.

According to an embodiment, when the first connection space is generated, the web application server 120 may generate a dedicated queue connected to the first connection space and transmit the dedicated queue to the message broker 150.

The relay server 130 receives the first connection code generated by the web application server 120 through the message broker 150, generates a second connection space in which the first connection code is stored, and receives a request for provision of the remote support service from the mobile terminal 140.

According to an embodiment, the relay server 130 may connect the second connection space to the dedicated queue generated by the web application server 120 through the message broker 150. Accordingly, the first connection space and the second connection space may be connected to each other via the dedicated queue.

That is, in other words, the web viewer 110 can access the first connection space on the web application server 120, and the mobile terminal 140 can access the second connection space on the relay server 130, and thus data may be transmitted and received between the web viewer 110 and the mobile terminal 140 as the first connection space and the second connection space are connected to each other.

According to an embodiment, when receiving the request for provision of the remote support service from the mobile terminal 140, the relay server 130 may receive a second connection code input from the mobile terminal 140 together.

Next, the relay server 130 may determine whether or not the first connection code and the second connection code match, and determine whether or not to connect between the first connection space and the second connection space based on whether or not the first connection code and the second connection code matches.

Specifically, when the second connection code input from the mobile terminal 140 matches the first connection code generated by the web application server 120, the relay server 130 determines that the user of the mobile terminal 140 is a valid user and connects the first connection space and the second connection space, thereby capable of allowing data for the remote support service to be transmitted between the web viewer 110 and the mobile terminal 140.

According to one embodiment, the second connection code may be a unique number that specifies a place where the mobile terminal 140 and the message broker 150 are connected to each other on the relay server 130, and may have a value randomly selected within a preset range for every generation.

According to an embodiment, the second connection code may be directly input by the user of the mobile terminal 140 according to a login method of the administrator, or may be automatically input without user intervention.

Specifically, when the administrator logs in by the first method, the mobile terminal 140 to perform the remote support service is not specified at the point in login time of the administrator, and thus the second connection code is directly input by the user of the mobile terminal 140, and the relay server 130 may determine the corresponding mobile terminal 140 as a target of the remote support service only when the second connection code matches the first connection code.

On the other hand, when the administrator logs in by the second method, the administrator selects the mobile terminal 140 to perform the remote support service at the point in time when requesting execution of the remote support service through the interface of the EMM server, and thus execution of the agent (or application) provided in the selected mobile terminal 140 and input of the second connection code may be automatically performed through a push message.

The message broker 150 mediates a plurality of message queues between the first connection space and the second connection space for the remote support service between the web viewer 110 and the mobile terminal 140.

In the following embodiments, the 'message queue' refers to a queue allocated to store input generated through the interface of the web viewer 110 or the mobile terminal 140 in the form of a message.

According to an embodiment, the message queue may be classified into a plurality of classes corresponding to types of stored data.

Specifically, the message queue can be classified as follows according to the types of data stored in the message queue.

(1) a control queue including data for managing the connection of the web application server 120, the relay server 130, the first connection space or the second connection space (2) a command queue including remote support control data from the web viewer 110 and remote support status data of the mobile terminal 140

(3) a file queue including an attached file transmitted between the web viewer 110 and the mobile terminal 14

According to an embodiment, the control queue may be used to transmit and receive data required for additional connection or removal of the web application server 120 or the relay server 130 or data required for removing the connection of the first connection space or the second connection space, or adding a new connection space. In addition, when data is transmitted through the control queue, the data may be received from all servers in the system for the remote support 100.

Meanwhile, according to an embodiment, the command queue may be used to transmit and receive remote support status data, such as current status information and screen data, of the mobile terminal 140 and remote support control data transmitted by the web viewer 110 to control the mobile terminal 140 between the connection spaces. In addition, the command queue may be divided into a command queue for transmission used to transmit data and a command queue for reception used to receive data.

Meanwhile, according to an embodiment, the file queue may be used to transmit and receive an attached file sent from the web viewer 110 or an attached file sent from the mobile terminal 140 spaces for remote support between the connection. In addition, the file queue may be divided into a file queue for transmission used to transmit data and a file queue for reception used to receive data.

Figure 2:
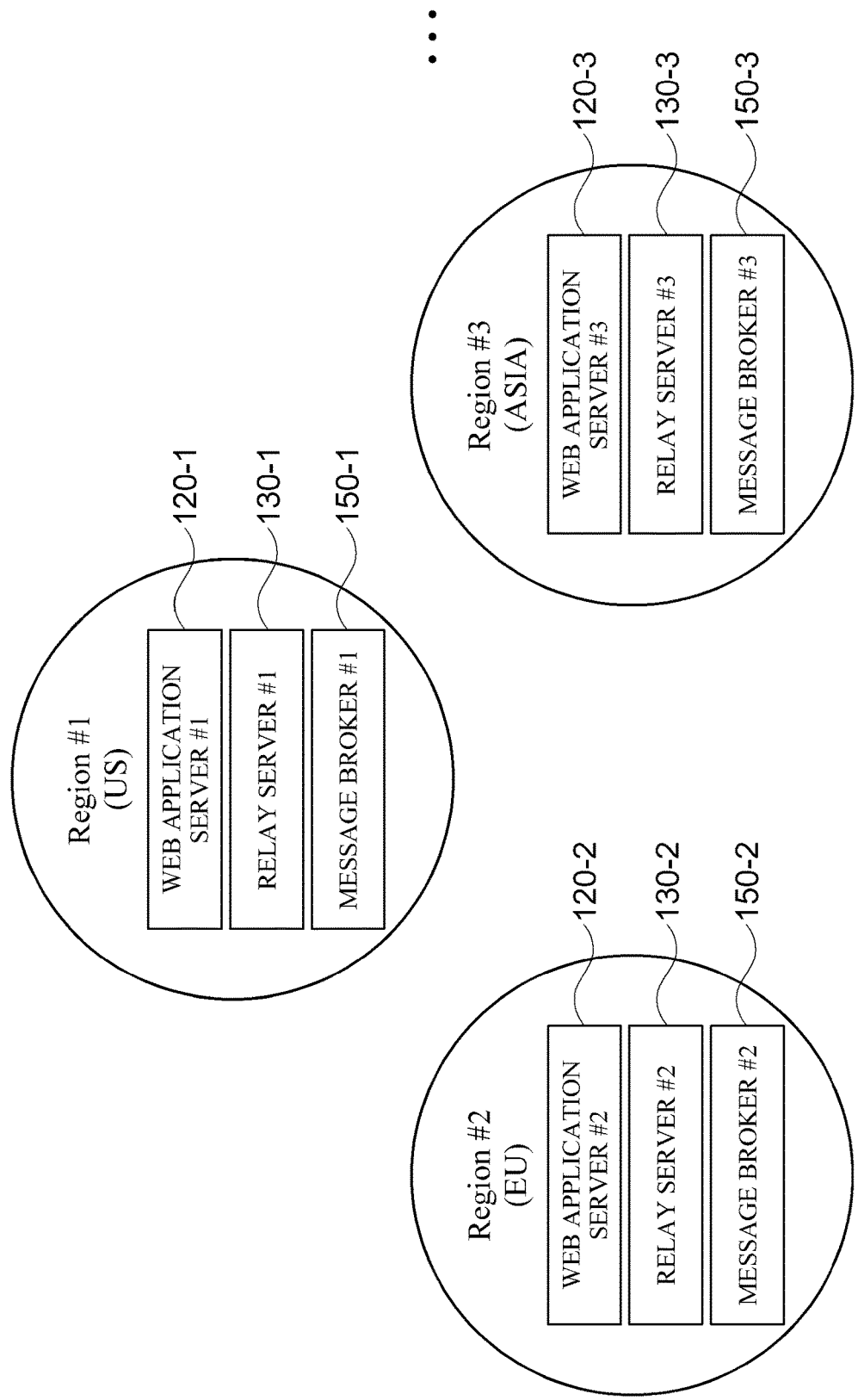
FIG. 2 is an exemplary diagram illustrating a web application server, a relay server, and a message broker for each region according to an embodiment.

FIG. 2 is an exemplary diagram illustrating the web application server, the relay server, and the message broker for each region according to an embodiment.

Referring to FIG. 2, web application server #1 (120-1), relay server #1 (130-1), and message broker #1 (150-1) may exist in region #1 (Region #1, e.g., US region), web application server #2 (120-2), relay server #2 (130-2), and message broker #2 (150-2) may exist in region #2 (Region #2, e.g., Europe), and web application server #3 (120-3), relay server #3 (130-3), and message broker #3 (150-3) may exist in region #3 (Region #3, e.g., Asian region). In FIG. 2, it is illustrated that only one relay server and one tenant management server exist for each region for convenience of explanation, but this is only an example and a plurality of relay servers may exist in one region.

The web application server 120 may determine one relay server 130 to be used for data relay related to the remote support service among a plurality of relay servers based on the identification information of the mobile terminal 140 registered in the EMM server.

Figure 3:
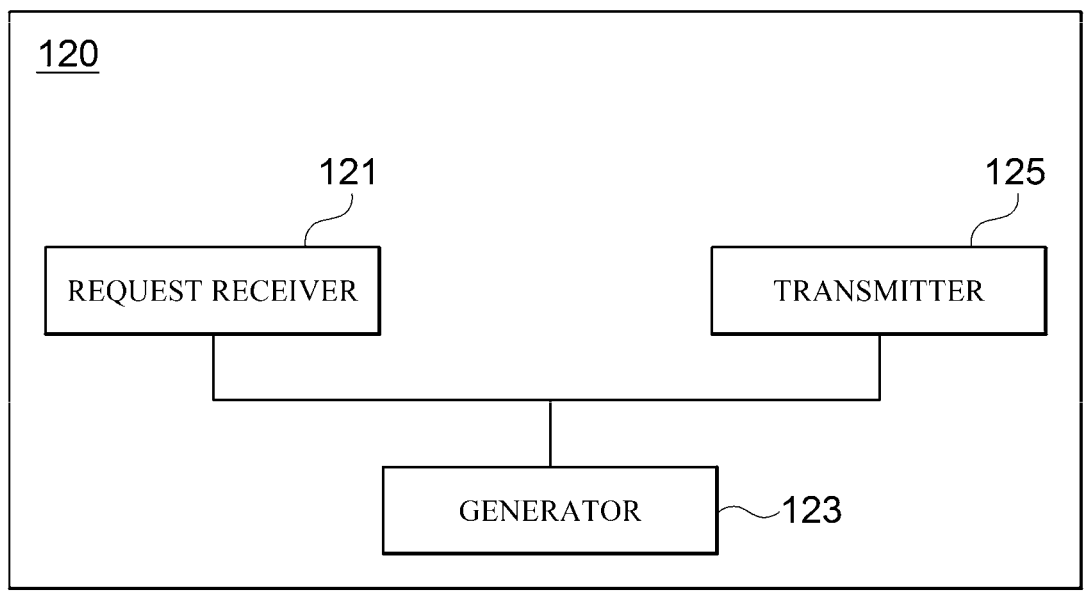
FIG. 3 is a block diagram illustrating a detailed configuration of a web application server according to an embodiment.

FIG. 3 is a block diagram for explaining the detailed configuration of the web application server 120 according to an embodiment.

As illustrated, the web application server 120 according to an embodiment includes a request receiver 121, a generator 123, and a transmitter 125.

The request receiver 121 receives a request for generation of a connection space for the remote support service from the web viewer 110.

The generator 123 generates a first connection space and a first connection code for identifying the first connection space based on the request for generation received by the request receiver 121.

The transmitter 125 transmits the first connection code to the relay server 130 communicating with the mobile terminal 140 through the message broker 150 for the remote support service between the web viewer 110 and the mobile terminal 140.

According to an embodiment, when the first connection space is generated by the generator 123, the transmitter 125 may generate a dedicated queue connected to the first connection space and transmit the dedicated queue to the message broker 150.

Figure 4:
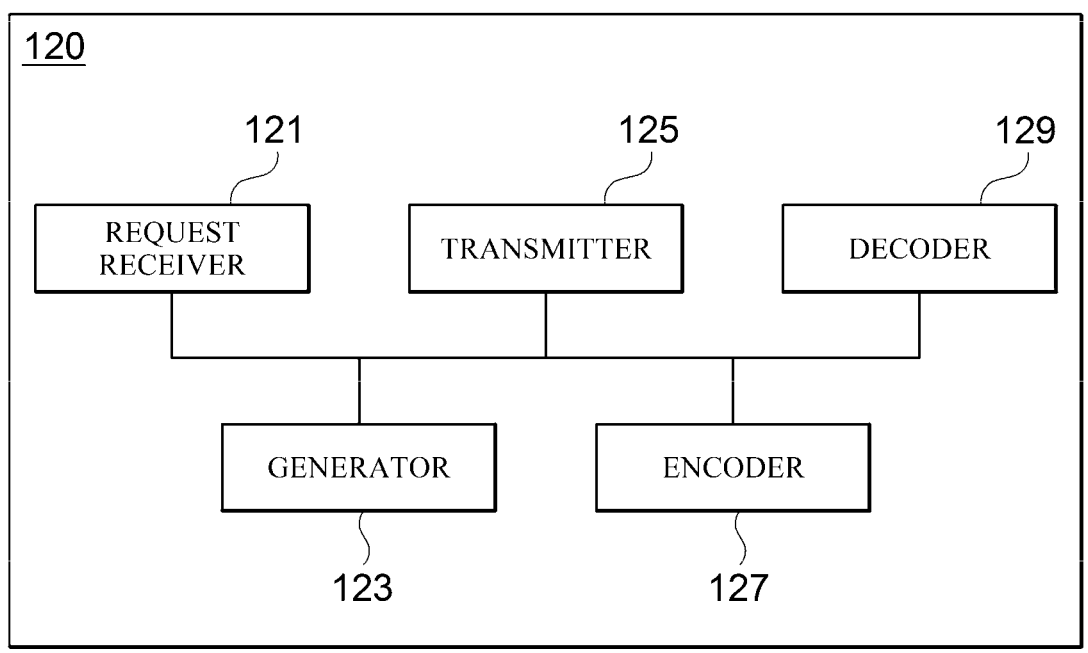
FIG. 4 is a block diagram for explaining the detailed configuration of a web application server according to an additional embodiment

FIG. 4 is a block diagram for explaining the detailed configuration of the web application server 120 according to an additional embodiment.

As illustrated, the web application server 120 according to an additional embodiment further includes an encoder 127 and a decoder 129, in addition to the request receiver 121, the generator 123 and the transmitter 125.

The request receiver 121, the generator 123, and the transmitter 125 according to the embodiment described with reference to FIG. 3 perform the same or similar functions as those described in the embodiment, and thus redundant descriptions thereof will be omitted.

The encoder 127 may generate an encryption key and encrypt data transmitted between the web viewer 110 and the mobile terminal 140 using the generated encryption key.

The decoder 129 may generate a decryption key, and decrypt the encrypted data transmitted between the web viewer 110 and the mobile terminal 140 using the generated decryption key.

That is, in other words, the web application server 120 may perform preliminary work for encryption and decryption so that information can be safely exchanged between the web viewer 110 and the mobile terminal 140.

In the embodiment illustrated in FIGS. 3 and 4, each of the components may have different functions and capabilities other than those described below, and may include additional components in addition to those described below.

In addition, in the embodiments described above, the request receiver 121, the generator 123, the transmitter 125, the encoder 127, and the decoder 129 may be implemented using one or more physically separated devices, or may be implemented by one or more processors or a combination of one or more processors and software, and may not be clearly distinguished in specific operation unlike the illustrated example.

Figure 5:
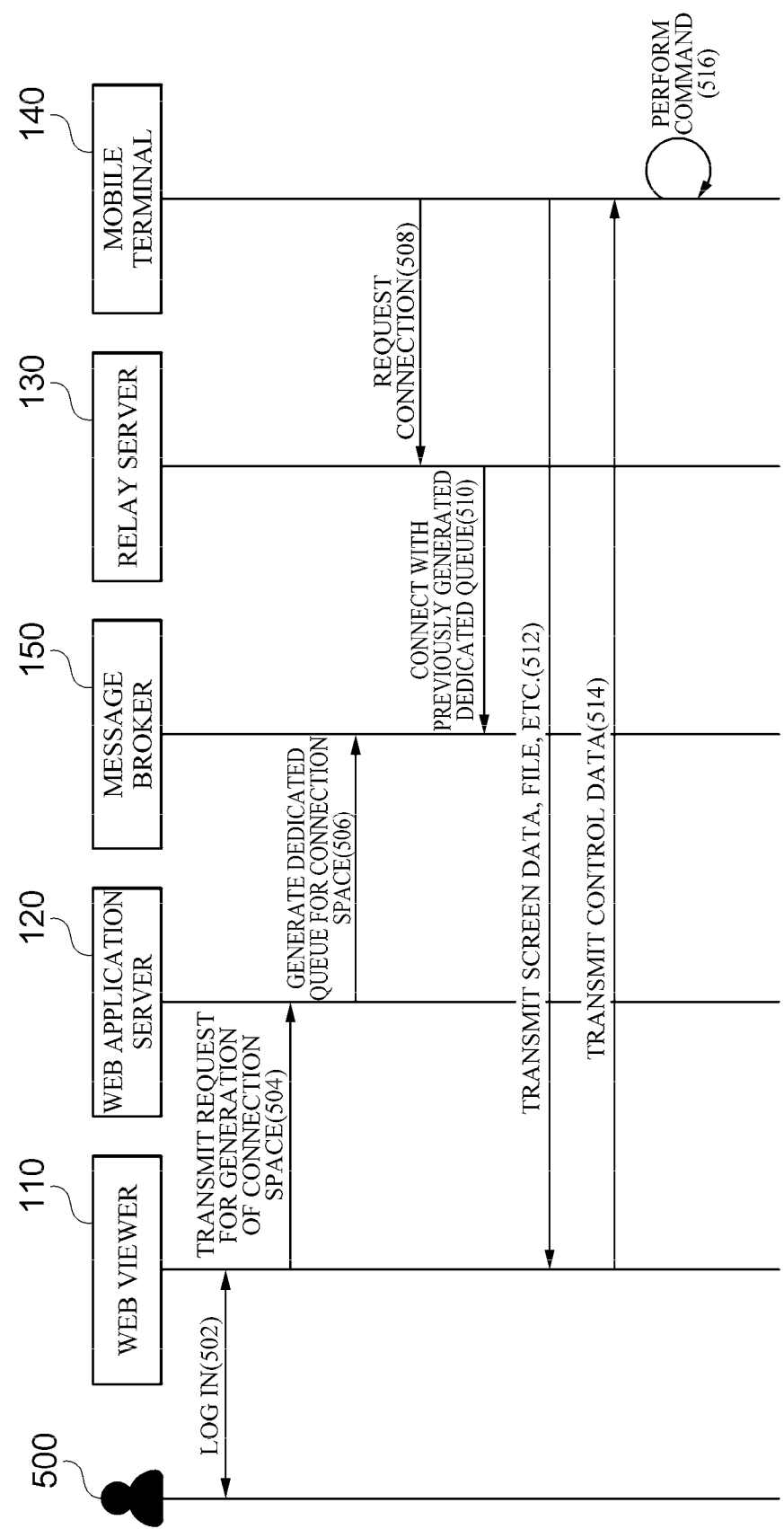
FIG. 5 is a flowchart illustrating a method for a remote support according to an embodiment.

FIG. 5 is a flowchart illustrating a method for the remote support according to an embodiment.

The method illustrated in FIG. 5 may be performed, for example, by the system for the remote support 100 described above.

In step 502, the administrator 500 performs a login in the web viewer 110 by a first method of authenticating an account with the EMM server in which the mobile terminal 140 is registered after connection through the web address or a second method of connecting through a web address after authenticating the account with the EMM server.

In step 504, the web viewer 110 transmits a request for generation of a connection space for the remote support service to the web application server 120.

In step 506, the web application server 120 generates a dedicated queue connected to the connection space after the generation of the connection space and transmits the dedicated queue to the message broker 150.

In step 508, the mobile terminal 140 requests a connection with the web viewer 110 to the relay server 130 in order to receive the remote support service.

In step 510, the relay server 130 connects the connection space on the relay server 130 with the dedicated queue stored in the message broker 150 according to the connection request of the mobile terminal 140.

In step 512, the mobile terminal 140 transmits the screen data, files, etc. required for receiving the remote support service to the web viewer 110 through the dedicated queue connecting the connection space on the web application server 120 and the connection space on the relay server 130

In step 514, when the administrator reviews a series of data, files, etc. transmitted from the mobile terminal 140 through the web viewer 110 and performs a control operation with the interface on the web viewer 110, the web viewer 110 transmits control data according to the control operation to the mobile terminal 140 through the dedicated queue.

In step 516, the mobile terminal 140 performs a command for handling a current specific problem or error based on the transmitted control data.

Figure 6:
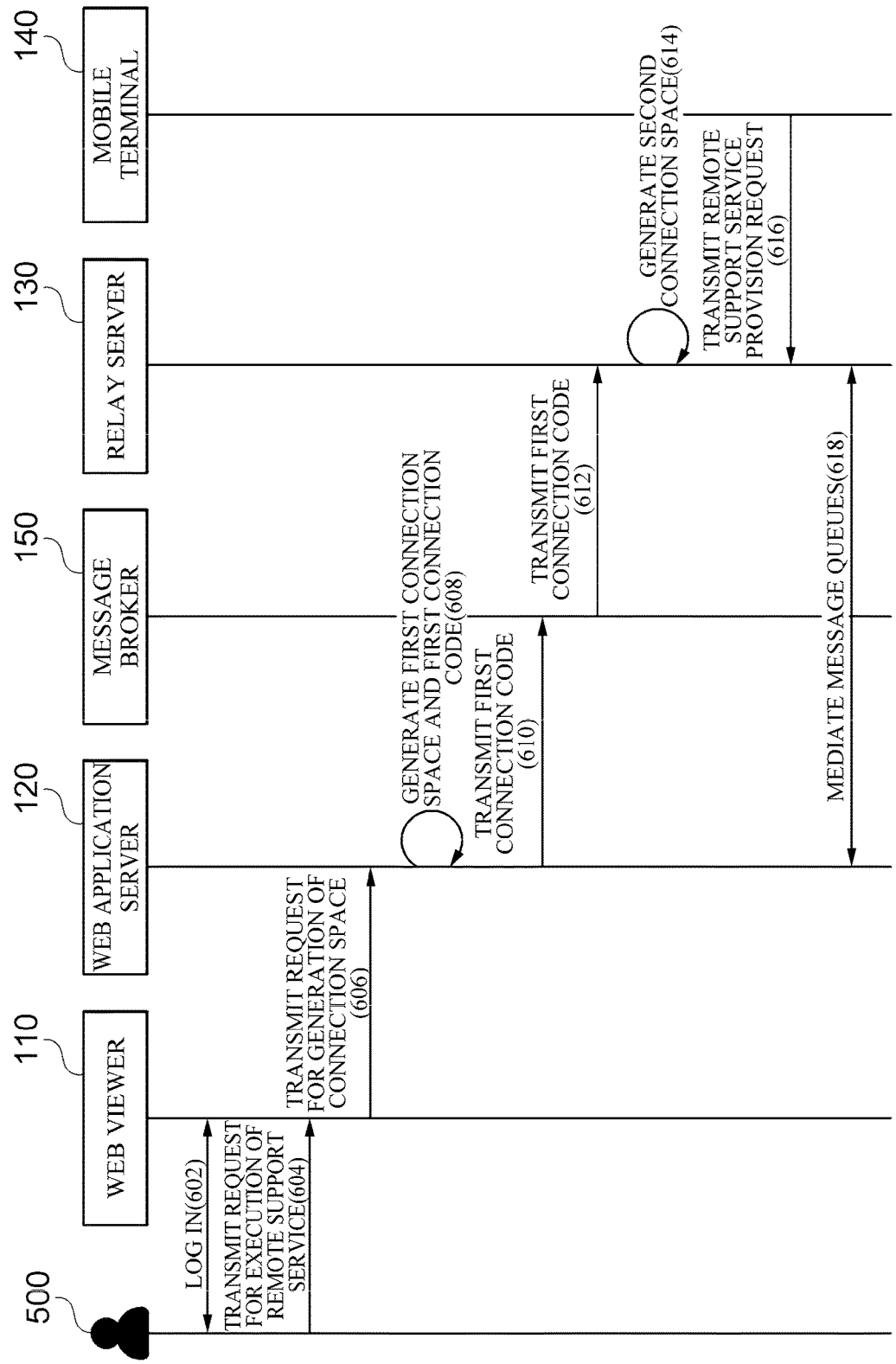
FIG. 6 is a flowchart for explaining in more detail a method for a remote support according to an embodiment.

FIG. 6 is a flowchart for explaining in more detail the method for the remote support according to an embodiment.

The method illustrated in FIG. 6 may be performed, for example, by the system for the remote support 100 described above.

In step 602, the administrator 500 performs a login in the web viewer 110 by the first method of authenticating an account with the EMM server in which the mobile terminal 140 is registered after connection through the web address or the second method of connecting through the web address after authenticating the account with the EMM server.

In step 604, the manager 500 transmits a request for execution of a remote support service to the web viewer 110.

In step 606, the web viewer 110 transmits a request for generation of a connection space for the remote support service to the web application server 120.

In step 608, the web application server 120 generates a first connection space and a first connection code for identifying the first connection space based on the transmitted request for generation.

In step 610, the web application server 120 transmits the first connection code to the message broker 150 through the dedicated queue connected to the first connection space.

In step 612, the message broker 150 transmits the first connection code to the relay server 130.

In step 614, the relay server 130 generates a second connection space in which the transmitted first connection code is stored.

In step 616, the mobile terminal 140 transmits a provision request requesting to provide the remote support service to the relay server 130.

In step 618, the message broker 150 mediates a plurality of message queues between the first connection space and the second connection space for the remote support service between the web viewer 110 and the mobile terminal 140. Accordingly, the web viewer 110 and the mobile terminal 140 may send and receive a series of data required for performing the remote support service through the message queue.

In FIGS. 5 and 6 illustrated above, the method described above has been described by dividing the method into a plurality of steps, but at least some of the steps may be performed in a different order, performed in combination with other steps, or omitted, performed by being divided into detailed steps, or performed by being added with one or more steps (not illustrated).

Figure 7:
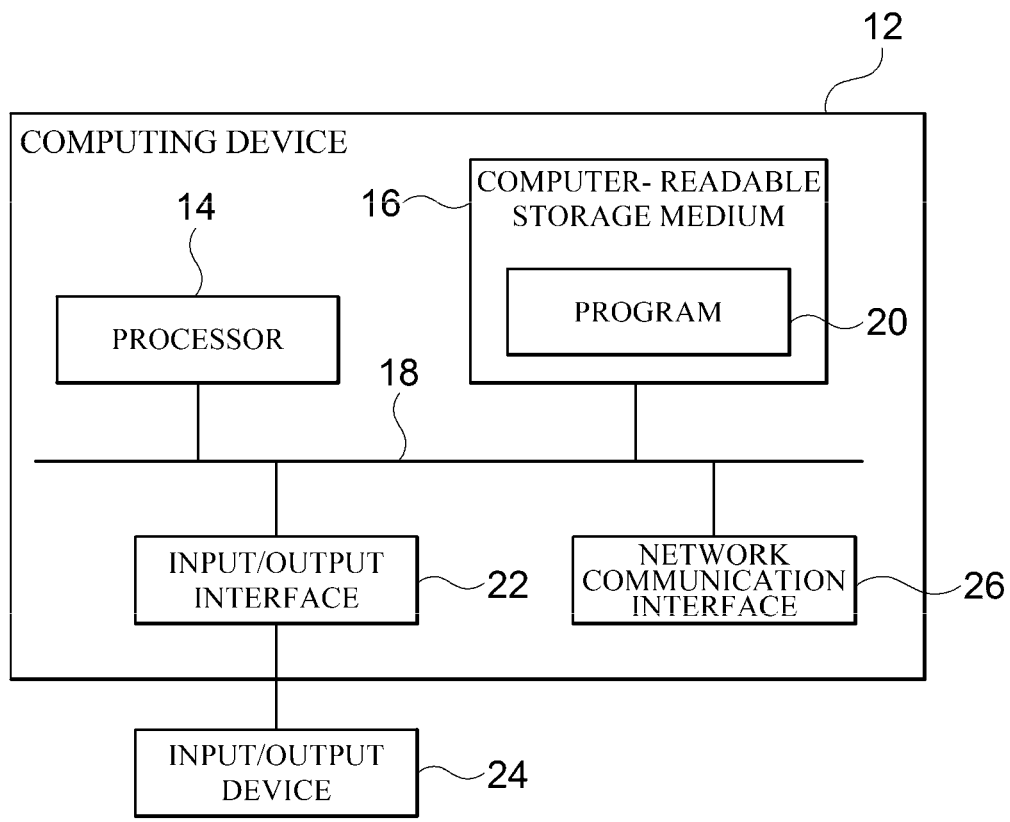
FIG. 7 is a block diagram illustratively describing a computing environment including a computing device according to an embodiment.

FIG. 7 is a block diagram for illustratively describing a computing environment 10 including a computing device according to an embodiment. In the illustrated embodiment, each component may have different functions and capabilities other than those described below, and may include additional components in addition to those described below.

The illustrated computing environment 10 includes a computing device 12. In an embodiment, the computing device 12 may be the web viewer 110. The computing device 12 may also be the web application server 120. Also, the computing device 12 may be the relay server 130 or the message broker 150.

The computing device 12 includes at least one processor 14, a computer-readable storage medium 16 and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing device 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, the embodiment of the present disclosure may include a program for performing the methods described in this specification on a computer, and a computer-readable recording medium containing the program. The computer-readable recording medium may contain program instructions, local data files, local data structures, etc., alone or in combination. The computer-readable recording medium may be specially designed and configured for the present disclosure, or may be commonly used in the field of computer software. Examples of computer-readable recording media include magnetic media such as a hard disk, a floppy disk, and a magnetic tape, optical recording media such as a CD-ROM and a DVD, and hardware devices such as a ROM, a RAM, a flash memory, etc., that are specially configured for storing and executing program instructions are included. Examples of the program may include a high-level language code that can be executed by a computer using an interpreter, etc., as well as a machine language code generated by a compiler.

According to the disclosed embodiments, by enabling the administrator to send and receive data required for remote support using a web viewer in a mobile environment as well as in a conventional PC, a faster and more flexible remote support service can be provided to a user of a mobile terminal.

In addition, according to the disclosed embodiments, by redefining various types of message queues by improving the format used for sending and receiving data between the conventional administrator's PC and the user of the mobile terminal, data required for remote support in a mobile environment can be transmitted more efficiently.

Although the present disclosure has been described in detail through representative examples above, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents of the claims.

What is claimed is:

1. A system for a remote support comprising:
    a web viewer configured to receive a request for execution of a remote support service from a logged-in administrator;
    a web application server configured to receive a request for generation of a connection space for the remote support service from the web viewer and generate a first connection space and a first connection code for identifying the first connection space based on the request for generation;
    a relay server configured to receive the first connection code, generate a second connection space in which the first connection code is stored, and receive a request for provision of the remote support service from a mobile terminal; and
    a message broker configured to mediate a plurality of message queues between the first connection space and the second connection space for the remote support service between the web viewer and the mobile terminal.

2. The system of claim 1, wherein the web viewer is further configured to perform login for the administrator by a first method of authenticating an account with an enterprise mobility management (EMM) server in which the mobile terminal is registered after connection through a web address or a second method of connecting through the web address after authenticating the account with the EMM server.

3. The system of claim 1, wherein the web application server is further configured to, when the first connection space is generated, generate a dedicated queue connected to the first connection space, and
  the relay server is further configured to connect the second connection space to the dedicated queue through the message broker.

4. The system of claim 1, wherein the relay server is further configured to, when receiving the request for provision, receive a second connection code input from the mobile terminal together with the first connection code, and determine whether or not to connect between the first connection space and the second connection space based on whether or not the first connection code and the second connection code match.

5. The system of claim 1, wherein the message queue comprises:
  a control queue including data for managing a connection of the web application server, the relay server, the first connection space, or the second connection space,
  a command queue including remote support control data from the web viewer and remote support status data of the mobile terminal, and
  a file queue including an attached file transmitted between the web viewer and the mobile terminal.

6. A web application server comprising:
  one or more processors,
  wherein the one or more processors are configured to perform operations of:
  receiving a request for generation of a connection space for a remote support service from a web viewer;
  generating a first connection space and a first connection code for identifying the first connection space based on the request for generation; and
  transmitting the first connection code to a relay server communicating with the mobile terminal through a message broker for the remote support service between the web viewer and the mobile terminal.

7. The web application server of claim 6, wherein the one or more processors are further configured to perform operation of, when the first connection space is generated, generating a dedicated queue connected to the first connection space.

8. The web application server of claim 6, wherein the one or more processors are further configured to perform operations of:
  generating an encryption key and encrypt data transmitted between the web viewer and the mobile terminal using the encryption key; and
  generating a decryption key and decrypt encrypted data transmitted between the web viewer and the mobile terminal using the decryption key.

9. A method for a remote support comprising:
  receiving, by a web viewer, a request for execution of a remote support service from a logged-in administrator;
  receiving, by a web application server, a request for generation of a connection space for the remote support service from the web viewer;
  generating, by the web application server, a first connection space and a first connection code for identifying the first connection space the request for generation;
  receiving, by a relay server, the first connection code;
  generating, by the relay server, a second connection space in which the first connection code is stored;
  receiving, by the relay server, a request for provision of the remote support service from a mobile terminal; and
  mediating, by a message broker, a plurality of message queues between the first connection space and the second connection space for the remote support service between the web viewer and the mobile terminal.

10. The method of claim 9, further comprising:
performing, by the web viewer login for the administrator by a first method of authenticating an account with an enterprise mobility management (EMM) server in which the mobile terminal is registered after connection through a web address or a second method of connecting through the web address after authenticating the account with the EMM server.

11. The method of claim 9, further comprising:
after the generating of the first connection space and the first connection code, generating, by the web application server, a dedicated queue connected to the first connection space; and
connecting, by the relay server, the second connection space to the dedicated queue through the message broker.

12. The method of claim 9, wherein
in the receiving of the request for provision, the second connection code input from the mobile terminal is received together with the first connection code,
the method further comprises
after the receiving of the request for provision, determining, by the relay server, whether or not to connect between the first connection space and the second connection space based on whether or not the first connection code and the second connection code match.

13. The method of claim 9, wherein the message queue comprises:
  a control queue including data for managing a connection of the web application server, the relay server, the first connection space, or the second connection space,
  a command queue including remote support control data from the web viewer and remote support status data of the mobile terminal, and
  a file queue including an attached file transmitted between the web viewer and the mobile terminal.

14. A method for a remote support comprising:
  receiving, by a request receiver of a web application server, a request for generation of a connection space for a remote support service from a web viewer;
  generating, by a generator of the web application server, a first connection space and a first connection code for identifying the first connection space; and
  transmitting, by a transmitter of the web application server, the first connection code to a relay server communicating with the mobile terminal through a message broker for the remote support service between the web viewer and the mobile terminal.

15. The method of claim 14, further comprising:
after the generating, by the transmitter, generating a dedicated queue connected to the first connection space.

16. The method of claim 14, further comprising:
generating, by an encoder of the web application server, an encryption key;
encrypting, by the encoder, data transmitted between the web viewer and the mobile terminal using the encryption key;
generating, by a decoder of the web application server, a decryption key; and
decrypting, by the decoder, the encrypted data transmitted between the web viewer and the mobile terminal using the decryption key.

* * * * *